United States Patent [19]

West et al.

[11] 4,189,939
[45] Feb. 26, 1980

[54] COMPACT MULTIMISSION AIRCRAFT PROPULSION SIMULATOR

[75] Inventors: Harrison West; Bobby R. Delaney, both of Cincinnati, Ohio

[73] Assignee: General Electric Company, Cincinnati, Ohio

[21] Appl. No.: 860,032

[22] Filed: Dec. 12, 1977

[51] Int. Cl.$^2$ ............................................... G01L 3/00
[52] U.S. Cl. ................................................... 73/116
[58] Field of Search ................................. 73/116, 147

[56] References Cited

PUBLICATIONS

AFAPL TR-76-73, "Turbine Engine Multimission Propulsion Simulator Wind Tunnel Demonstration", Nov. 1976, Eigenmann et al.
AFAPL-TR-73-25, vol. I, "Multimission Turbine Engine Propulsion Simulator Users Console", May 1973, Delaney et al.
AFAPL TR-73-77, "Multimission Aircraft Propulsion Simulator Initial Aero/Mechanical Test Results & Evaluation", Dec. 1973, Delaney et al.

*Primary Examiner*—Anthony V. Ciarlante
*Attorney, Agent, or Firm*—Robert C. Lampe, Jr.; Derek P. Lawrence

[57] ABSTRACT

A compact apparatus for simulating the in-flight aerodynamic performance of a multimission aircraft propulsion system of the gas turbine engine variety having an external envelope of a reduced size in relation to the engine to be simulated. The apparatus includes a turbine driven by externally generated, high pressure motive air which is drivingly connected to a compressor in the usual manner of a gas turbine engine. The flow of air pressurized by the compressor is mixed with a portion of the relatively higher pressure turbine motive air so as to generate a mixed flow having a generally uniform pressure profile entering the exhaust nozzle. The compressor, turbine, mixer and nozzle are sized to produce a pressure ratio across the apparatus and a nozzle flow function which are substantially identical to the engine to be simulated, though these components are of a reduced size in relation thereto. Through modulation of the amount of turbine motive air which is mixed with the air pressurized by the compressor, the nozzle flow function and pressure ratio can be altered to simulate a wide range of engine operating cycles including those associated with reheat and dry operation. The remainder of the turbine motive air exhausts from the apparatus as a nonpropulsive stream.

45 Claims, 22 Drawing Figures

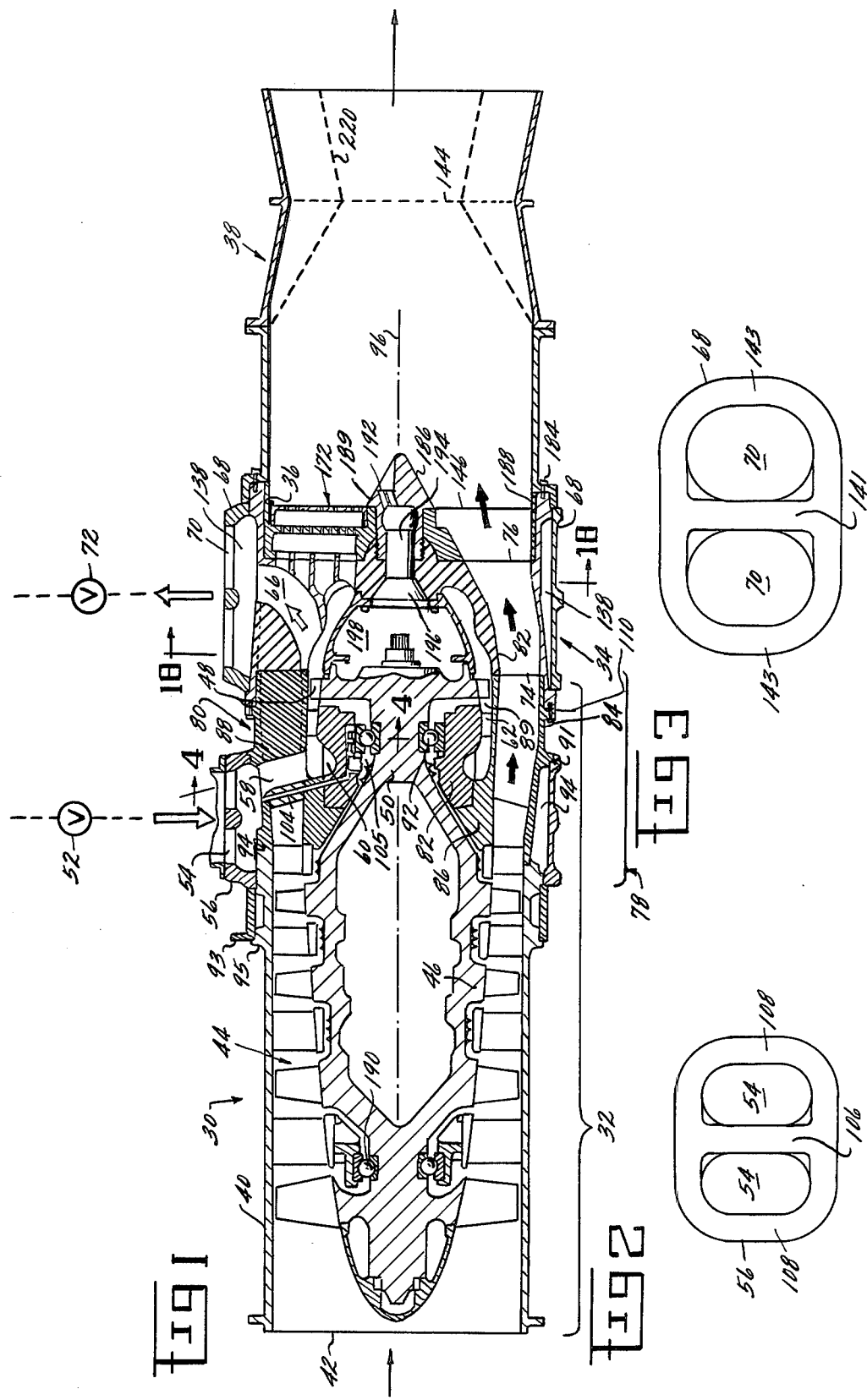

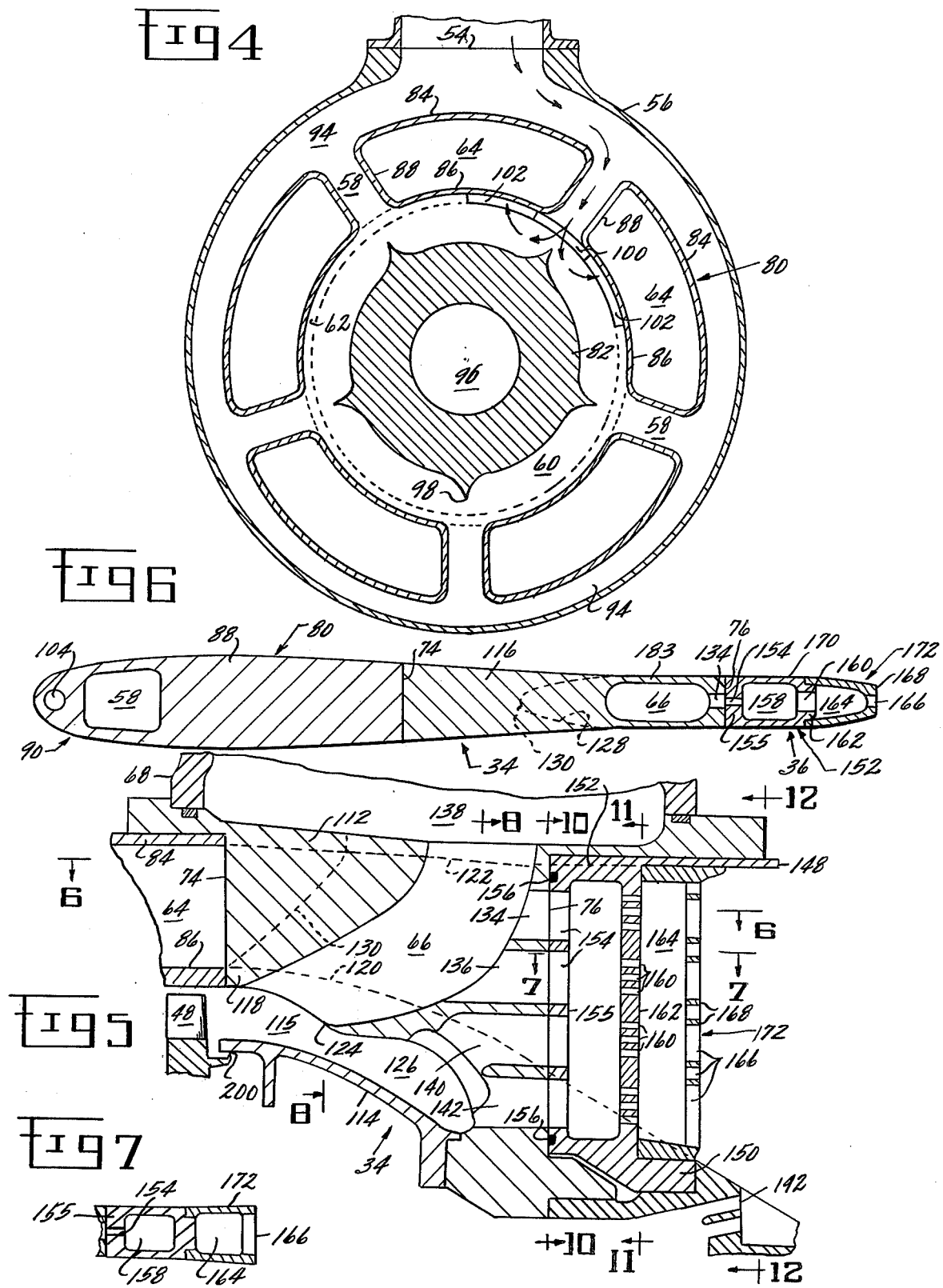

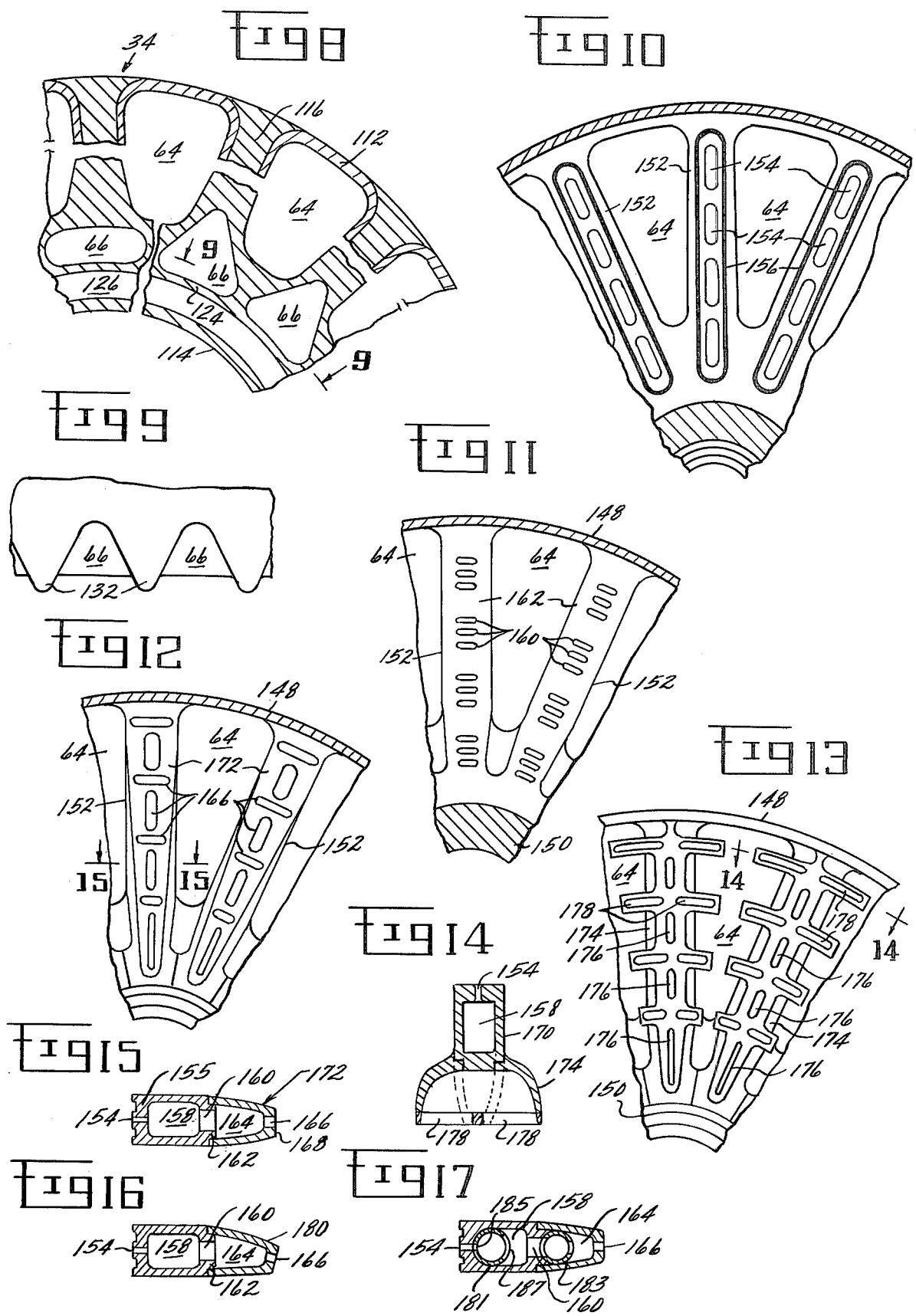

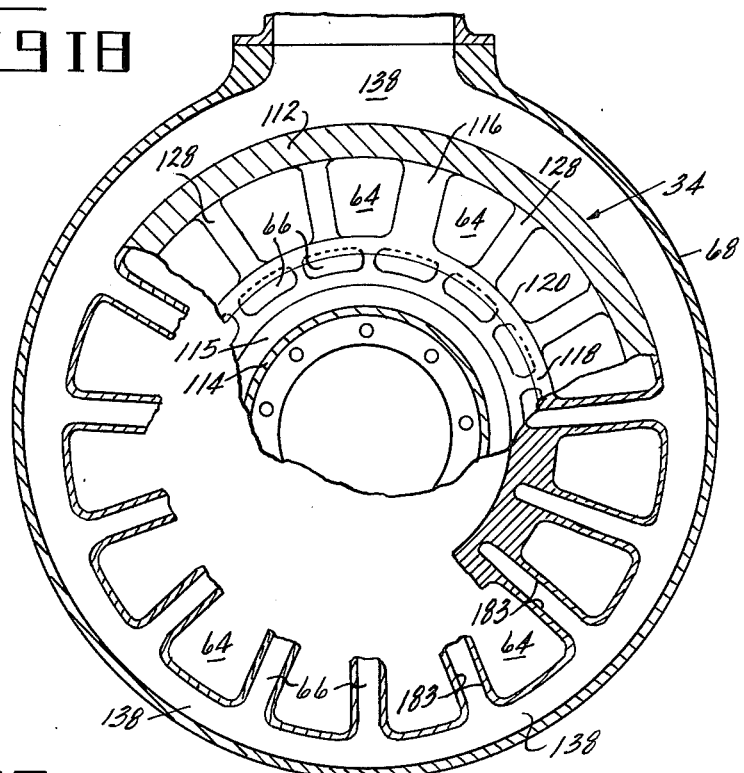
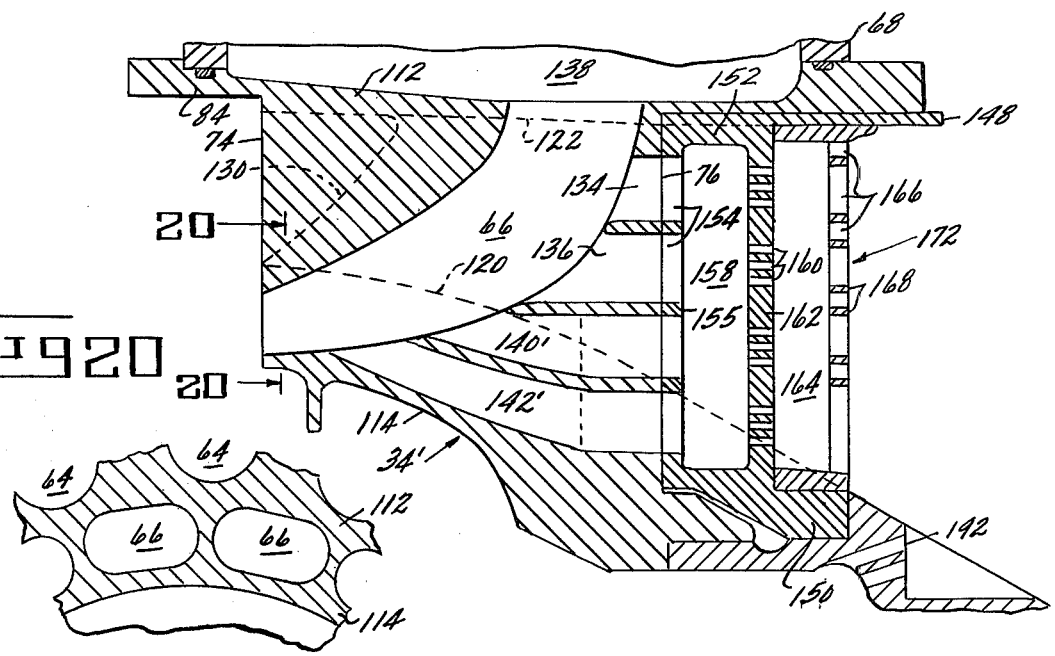

COMPACT MULTIMISSION AIRCRAFT PROPULSION SIMULATOR

The invention herein described was made in the course of or under a contract or subcontract thereunder (or grant) with the United States Air Force.

BACKGROUND OF THE INVENTION

This invention relates to a compact gas turbine engine propulsion simulator and, more particularly, to a miniaturized turbomachine in which a pneumatic energy supply system replaces the conventional fuel-fired combustor of a gas turbine engine and which is capable of accurately reproducing the in-flight aerodynamic characteristics of a wide range of gas turbine engines and gas turbine engine cycles when installed in an aircraft model during wind tunnel testing.

It has long been the accepted practice of the aircraft industry to simulate the in-flight performance characteristics of aircraft by testing scale models in wind tunnels. In this manner, the design and development cost and time are significantly reduced. However, there has historically been a great deal of difficulty in correlating full-scale aircraft data with scale model wind tunnel data due, largely, to the inability of an unpowered model to simulate simultaneously all of the complex flow interactions between the aircraft structure and its power plant. In the case of gas turbine engine (turbojet or turbofan) propulsion, this was true regardless or whether the engine was mounted externally, as on a pylon, in a pod, or internally of the aircraft. However, several years ago an important innovation occurred in propulsion simulation for scale model wind tunnel testing with the introduction of the simulated reaction engine model described in particularity in U.S. Pat. No. 3,434,679, issued to John T. Kutney et al, and which is assigned to the assignee of the present invention.

This model, for the first time, provided the basis for simulating the in-flight aerodynamic characteristics of a subsonic, high bypass, fan-type gas tubine (turbofan) engine in a subsonic wind tunnel aircraft model. Basically, the external configuration of the simulated engine model was sized and reduced by a linear scale of the engine simulated, while the fan and turbine were sized to develop a pressure ratio across the fan substantially similar to the pressure ratio across the simulated engine fan and a mass flow rate reduced in relation to the mass flow rate of the simulated engine by substantially the square of the reduced linear scale. For subsonic turbofan propulsion simulation, such as characterizes current wide-body commercial aircraft, this technique now enjoys industry acceptance. However, as successful as the simulator of Kutney et al has been, it has not proven entirely adequate for propulsion simulation of internally or pod-mounted gas turbine engines for supersonic, fighter-type aircraft characterized by afterburning (reheat) or non-afterburning (dry) operating modes. For this type of wind tunnel program, three tests must still be conducted in an attempt to achieve realism. First, the aircraft model is tested in a flow-through mode wherein the incoming engine flow is permitted to enter the inlet and flow through the model. However, in order to vary inlet flow over the required range, the aft end geometry must be distorted. Next, the jet-effects mode correctly simulates the aft flow field only. Here the inlet is faired over, diverting all of the flow around the model. High pressure air is introduced and then exhausted through the correct nozzle geometry at the required nozzle pressure ratio. Finally, an additional test to obtain isolated inlet performance has also been found to be necessary. The results of these three tests are then combined analytically without accounting for simultaneous interactions of the forward and aft flow fields or model-to-model geometry differences.

The problem now confronting the test engineer is how to simulate the wide range of propulsion flow fields and complex flow interactions in wind tunnel model aircraft testing required of a truly integrated model aircraft and propulsion system. In particular, what is needed is a propulsion simulator having multimission operational flexibility (i.e., capable of simulating a wide range of engine cycles) in order to model increasingly sophisticated engine installations with complex aircraft/engine interactions and integration problems. Preferably, the simulator must be capable of simulating a wide range of engine types and cycles with a single, standard basic gas generator which is readily comfortable to particular test aircraft requirements. Furthermore, the tight constraints on space in aircraft wind tunnel models dictate that the simulator be extremely compact in order to avoid compromising the aircraft envelope in order to accommodate the propulsion simulator.

SUMMARY OF THE INVENTION

Accordingly, it is the primary object of the present invention to provide a compact gas turbine engine propulsion simulator having multimission operational flexibility and which acts, when installed in a scale model wind tunnel aircraft, substantially the same as a truly integrated, full-scale propulsion system.

It is a further object of the present invention to provide such a propulsion simulator which, geometrically and aerodynamically, acts in all capacities as though it were an actual engine having the same specific inlet airflow (airflow per unit flow area), engine pressure ratio, nozzle flow function, and exhaust geometry as does the full-scale engine.

It is another object of the present invention to provide a propulsion simulator which permits a realistic propulsion installation in a very tight model aircraft envelope.

It is another object of the present invention to simulate a wide range of engine types and cycles with a single basic propulsion simulator gas generator.

It is yet another object of the present invention to provide such a propulsion simulator with means for permitting engine cycle variability with a minimum of changes in the simulator exhaust system configuration hardware.

It is another object of the present invention to provide a propulsion simulator which incorporates a unique mixer to produce a generally uniform exhaust pressure and temperature profile in the exhaust system.

It is still another object of the present invention to provide a propulsion simulator which provides multimission operational flexibility with relatively cool mechanical structures as required of practical wind tunnel installations.

It is still another object of the present invention to provide a propulsion simulator which simulates reheat operation by substituting flow for temperature to obtain a particular predetermined exhaust nozzle flow function.

It is yet another object of the present invention to provide a method of simulating in-flight aerodynamic characteristics of a gas turbine engine with an apparatus of a reduced size in relation to the engine to be simulated and of the type having a compressor for pressurizing a flow of air and a turbine for driving the compressor.

These and other objects and advantages will be more clearly understood from the following detailed description, drawings and specific examples, all of which are intended to be typical of rather than in any way limiting to the scope of the present invention.

Briefly stated, the above objectives are accomplished in a compact turbomachinery apparatus having a flow inlet sized in predetermined reduced proportion to the engine to be simulated. A compressor is sized to pressurize a flow or air, the flow through the inlet being reduced from that of the engine to be simulated by substantially the square of the linear scale factor. A turbine is drivingly connected to the compressor and is driven by externally generated motive air at a pressure substantially greater than that discharging from the compressor. A unique mixer is provided to mix the flow of air pressurized by the compressor with a predetermined portion of the relatively higher pressure turbine motive air so as to generate a mixed flow having generally uniform pressure and temperature profiles entering the exhaust nozzle, and of a level sufficient to produce a pressure ratio, associated with the mixed flow portions, across the apparatus substantially identical to the engine to be simulated. Additionally, the exhaust nozzle, like the inlet, is scaled in the predetermined reduced proportion of the engine to be simulated so that the flow passing therethrough from the mixer has associated therewith an exhaust nozzle flow function substantially identical to the engine to be simulated. Means are provided to modulate the amount of high pressure turbine motive air which is mixed with the air pressurized by the compressor so as to alter the nozzle flow function to simulate a wide range of engine operating cycles, including those associated with reheat and dry engine operation. In essence, an increase in mixer-injected turbine motive airflow is used to compensate for the higher exhaust temperatures normally associated with engine reheat operation. That portion of the turbine motive air which is not required to simulate the exhaust flow characteristics of the engine is routed from the apparatus as a non-propulsive stream.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which are given by way of example with the accompanying drawings in which:

FIG. 1 is a cross-sectional view of the compact multimission aircraft propulsion simulator of the present invention illustrating the flow passages through the simulator;

FIG. 2 is a top plan view depicting the flow inlet port to the turbine drive manifold;

FIG. 3 is a top plan view illustrating the flow outlet port from the turbine bleed manifold;

FIG. 4 is an enlarged cross-sectional view taken along line 4—4 of FIG. 1 and depicting the drive manifold, the main frame and the flow passages therein in greater particularity;

FIG. 5 is an enlarged view of the bleed frame and mixer portions of the propulsion simulator of FIG. 1 depicting the construction thereof in greater detail;

FIG. 6 is a further enlarged cross-sectional view taken along line 6—6 of FIG. 5;

FIG. 7 is a cross-sectional view taken along line 7—7 of the mixer portion of FIG. 5;

FIG. 8 is an enlarged fragmented sectional view taken along line 8—8 of FIG. 5 depicting the flow passages into the bleed frame of the propulsion simulator of the present invention with an inset illustrating a "turbine's eye view" of the flow passages;

FIG. 9 is a circumferential view of the inlet to the bleed frame taken along line 9—9 of FIG. 8;

FIG. 10 is a sectional view taken along line 10—10 of FIG. 5 illustrating the mixer at the interface with the bleed frame;

FIG. 11 is a sectional view taken along line 11—11 of FIG. 5 illustrating in greater particularity the flow passages through the mixer portion of the propulsion simulator;

FIG. 12 is a sectional view taken along line 12—12 of FIG. 5 illustrating the geometry of the discharge of the mixer;

FIG. 13 is a sectional view similar to FIG. 12 depicting an alternative embodiment of the present invention;

FIG. 14 is a sectional view taken along line 14—14 of FIG. 13 depicting the geometry at the discharge of the mixer chute;

FIGS. 15-17 are views similar to FIG. 7 illustrating alternative embodiments of the construction of the mixer portion of the present invention;

FIG. 18 is an enlarged fragmented view taken along line 18—18 of FIG. 1 and illustrating the flow passageways through the main frame and bleed frame portions of the simulator of the present invention;

FIG. 19 is a view, similar to FIG. 5, illustrating an alternative embodiment of the bleed frame portion of the propulsion simulator of FIG. 1;

FIG. 20 is a fragmented view taken along line 20—20 of FIG. 19; and

DESCRIPTION OF THE PREFERRED EMBODIMENT

Figure 21:
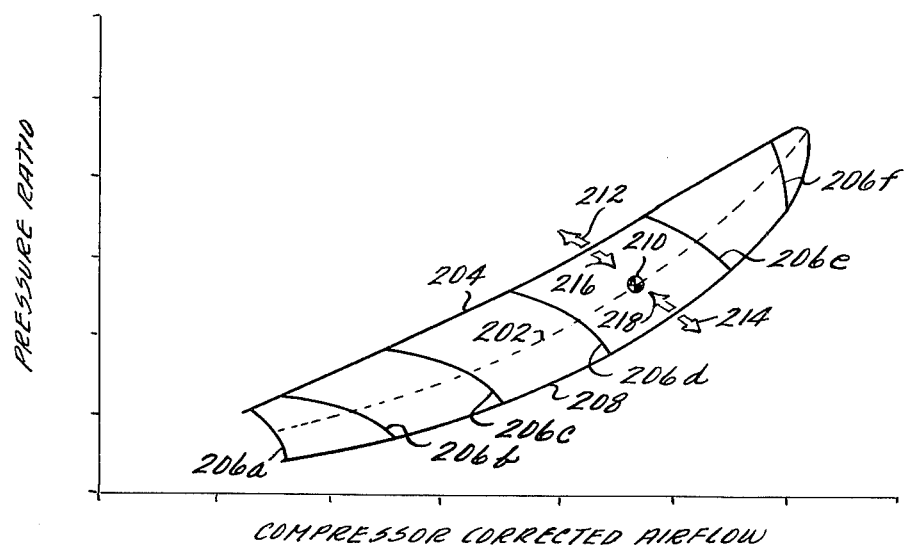
FIGS. 21 and 22 illustrate schematically the performance maps of an engine operated in the dry and reheat modes, respectively.

Referring to the drawings wherein like numerals correspond to like elements throughout, attention is first directed to FIG. 1 wherein a compact, multimission aircraft propulsion simulator constructed in accordance with the present invention and designated generally 30 is diagrammatically shown. As noted hereinbefore, the function of the compact, multimission aircraft propulsion simulator is to simulate the propulsive flow fields associated with a wide range of gas turbine engines and cycles in order to facilitate the realistic wind tunnel testing of sophisticated aircraft models and to provide such a wide range of simulation in a single, basic gas generator. To that end, the apparatus of FIG. 1 is shown to resemble at first glance a scaled version of the gas turbojet engine which the present invention is intended to simulate, with important distinctions which will be hereinafter described in greater particularity. This propulsion simulator 30 includes basically four modules, identified as a basic gas generator 32, bleed frame 34, mixing means such as multichoke mixer 36 and exhaust nozzle 38.

Gas generator 32 includes a generally tubular casing 40 defining at its open end a flow inlet 42. Air entering inlet 42 is initially compressed by a multistage axial flow compressor 44 having a rotor 46 which is rotationally driven by a single-stage turbine 48 through shaft 50 in the usual manner of a gas turbine engine. The turbine is driven by an externally generated, high pressure motive fluid (typically, high pressure air) at a temperature of approximately 200° F. which enters the propulsion simulator apparatus through a servo-controlled, drive air valve 52 and flows into the inlet 54 of a structural drive manifold 56. By this means, the conventional fuel-fired combustor normally associated with a full-sized gas turbine engine has been replaced with a low-temperature albeit high pressure (approximately 2000 psi) pneumatic energy supply. The turbine motive air flows inwardly from drive manifold 56 and through a strutted main frame 80 via a plurality of inclined passageways 58, into a turning plenum 60 and thereafter through a stage of turbine nozzle vanes 62, which may be of either the fixed or variable area type as can be appreciated by those skilled in the gas turbine engine art. Energy is extracted from the motive air by the turbine 48 in order to rotationally drive the compressor rotor 46. Contemporaneously, the relatively low pressure compressor discharge air flows axially through a plurality of passageways 64 in the strutted main frame 80, bypassing turbine 48. Thereafter, the compressor discharge air is mixed with a portion of the turbine motive air in the multichoke mixer 36. The remainder of the turbine motive air is scooped outwardly through multiple upchutes 66 in bleed frame 34, is collected by the bleed manifold 68 and discharges from the apparatus through bleed manifold exits 70 and servo- or manually controlled bleed air valve 72 as a nonpropulsive stream.

It is important that the compact multimission aircraft propulsion simulator 30 simulate as much as possible the aerodynamic characteristics of the engine to be simulated so that the complex interactions between the gas turbine engine and the wind tunnel model aircraft in which it is mounted can be measured in order to predict the full scale performance of the integrated aircraft/propulsion system. To this end, inlet 42 and exhaust nozzle 38 must be sized in a predetermined reduced proportion to the full-sized engine to be simulated. In other words, they are made to an exact reduced scale of the full-sized engine. Since the compact propulsion simulator of the present invention is comtemplated to be installed internally of the wind tunnel test aircraft model, the external geometry of the remainder of the simulator (e.g., length and overall diameter of casing 40) is immaterial, except that tight constraints of space within the model aircraft dictate that the simulator be made as small as is required to avoid distortion of the aircraft model external contour. The simulator of the present invention has incorporated novel features which permit an extremely compact simulator to be fabricated.

In order to further simulate the aerodynamic characteristics of a full-sized engine, turbine 48 and compressor 44 are sized to cause the compressor to draw an airflow through inlet 42 of predetermined proportion to the engine to be simulated and, in particular, of a magnitude substantially equal to the flow through the engine to be simulated times the square of the linear scale factor previously applied to inlet 42. The magnitude of the pressure ratio of the flow exiting the compressor is not particularly critical to the operation of the simulator per se, trough it is appreciated that this pressure will be substantially less than the motive air discharging from turbine 48 and with which it is eventually mixed. However, in order to provide meaningful and aerodynamically desired interaction effects, the mixing means represented by multichoke mixer 36 is designed and sized to produce a flow mixture entering nozzle 38 having a generally uniform radial and circumferential pressure profile of a magnitude such that the average pressure ratio of the mixture (hereinafter referred to as "engine pressure ratio" or "EPR") is substantially identical to the engine being simulated and the exhaust nozzle 38 flow function is also substantially identical to the full-scale counterpart. As used herein, the term "flow function" is intended to refer to the aerodynamic quantity represented as $w\sqrt{T}/PA$, wherein w = mass flow rate,
T = temperature of the fluid,
P = pressure of the fluid, and
A = cross-sectional flow area.

It is well recognized that advanced aircraft, particularly those of the supersonic variety, will probably have gas turbine propulsion systems which operate in two distinctly different modes, often referred to as an afterburning mode in which certain propulsive gases are reheated after passing through a combustor and turbine (hence, the alternative term "reheat operating mode") and nonafterburning operation (dry operating mode). The particular engine configuration can be any one of an infinite number of varieties, but for the purposes of the present invention it suffices to say that when any one of these gas turbine engines switches between dry and reheat operation, there is a comtemporaneous change in the exhaust gas temperature and, hence, the exhaust nozzle flow function. It is the intent of the present invention to provide a compact multimission aircraft propulsion simulator which can simulate the aerodynamic characteristics of dry and reheat operation in a single apparatus without utilizing the process of combustion. In other words, the propulsion simulator of the present invention is capable of simulating reheat operation, normally characterized by a flow of very hot exhaust gases, with relatively cold flow, through the variable injection of turbine discharge air into the compressor discharge stream to simulate the required reheat exhaust flow function. The basis of this concept is that additional mass flow (w) can be substituted for the higher temperature (T) normally generated in a reheat burner. Since the exhaust nozzle doesn't know or care about the relative contribution of w or the square root of T to the net value of the flow function numerator (while holding the correct value of exhaust pressure ratio), the aerodynamic effect of hot exhaust flow can be simulated at relatively cool temperatures (approximately 500° F.). This solves the problem of providing multimission operational flexibility with relatively cool mechanical structures required of practical wind tunnel installations.

Therefore, the present invention contemplates simulating the aerodynamic characteristics of a full-sized gas turbine engine with a scaled propulsion simulator in which the inlet and exhaust areas (42 and 144, respectively) are sized in a predetermined reduced linear proportion of the engine to be simulated, the compressor 44 is sized to pass a mass flow rate of air through inlet 42 reduced in proportion to the engine to be simulated by substantially the square of the linear scale factor, the mixer 36 is sized and configured to produce a flow mixture of generally uniform pressure profile having associated therewith an engine pressure ratio substantially identical to the engine to be simulated and wherein the exhaust nozzle (38) mass flow function is substantially the same as the engine to be simulated (and, in particular, the engine operating mode to be simulated). These must be provided within the constraints of minimum overall simulator size in order to fit the tight installation envelopes of wind tunnel test models.

The problem of providing the desired compactness contemporaneous with the required aerodynamic simulation is a particularly challening one considering the high pressures required to drive the single-stage turbine 62 and, thus, four-stage compressor 44 at approximately 80,000 rpm. In implementing a solution to this problem, the compact multimission aircraft propulsion simulator 30 is split at two unconventional and unique parting planes 74 and 76, perpendicular to the engine centerline 96, the purpose for which will soon become readily apparent. Plane 74 separates the bleed frame 34 from the basic gas generator 32 which will now be described in greater particularity.

Referring now to FIGS. 1, 4 and 6, the aft end of the gas generator is shown to include means for routing the externally generated flow of high pressure motive air to turbine 48 to rotationally drive the turbine and compressor 44 such as, for example, the structural main frame assembly denoted generally 78 and comprising drive manifold 56, strutted main frame 80 and main frame hub 82. Main frame 80 includes an outer structural ring 84 and an inner annular support member 86 connected by a plurality of aerodynamically contoured hollow main struts 88, herein five in number. As is best shown in FIG. 6, main struts 88 which initiate in the main frame have an aerodynamic profile which is carried through the gas generator, bleed frame 34 and mixer 36 modules as a single integrated, tandem butt strut assembly 90 which is carefully aligned at planes 74 and 76. Compressor discharge air flows around the strut assemblies through passageways 64 (FIG. 4) to nozzle 38.

The main frame hub 82 cooperates with the main frame 80 to define a turbine motive air flow path 89 through nozzle 62 and turbine 48, and supports bearing 92 within which rotor shaft 50 is journaled for rotation. Drive manifold 56 circumscribes main frame 80 to define therebetween an annular plenum 94 which feeds turbine motive air to the inclined hollow passageways 58 within each strut 88. The drive manifold is piloted by the outside diameter of main frame 80 and is limited in rearward axial travel by main frame stepped diameter portion 91. A split retaining ring 93 inserted between a collar 95, associated with tubular casing 40, and drive manifold 56 restrains the manifold against forward movement.

Obviously, the higher the pressure of the turbine motive fluid, the more compact the simulator can theoretically become. However, reasonable hydrostatic test criteria and yield strength of available materials limit the turbine drive air pressure to approximately 2000 psi maximum. The present configuration of the main frame assembly optimizes compactness by minimizing pressure losses in such a 2000 psi system. This is accomplished by sizing the turbine motive fluid flow path to establish the motive fluid Mach mumbers at efficient operating levels. Referring again to FIG. 4, it may be observed that the drive manifold 56 is a higly stressed, thin-walled structure of circular cross section capable of carrying the primary pressure loads of the motive fluid entering annular plenum 94 via inlet 54 in pure hoop stress without bending. However, drive manifold 56 is mounted eccentrically with respect to the engine centerline 96 and main frame 80 in order to produce a generally scrolled plenum cross-sectional area 94 between the drive manifold and main frame structural ring 84 which converges from the center of port 54 to the opposite side of manifold 56 to compensate for flow being ducted through the strut passages 58, thereby maintaining the Mach number of the turbine motive air substantially constant, at a predetermined optimum level, about the circumference of plenum 94. Flow turning angles are minimized by sweeping passages 58 in the aft direction by about 15° from the radial direction, thereby minimizing turning losses.

The perimeter of main frame hub 82 is provided with a plurality of radially protruding flow dividers 98, one aligned with the center of each strut passageway 58 within turning plenum 60. As shown by the flow arrows of FIG. 4, flow dividers 98 guide a portion of the turbine motive air through a rearwardly directed turn of approximately 75° into the turbine nozzle (62) sectors 100 in general alignment with the strut passages 58. The balance of the flow from each strut passage is turned circumferentially through approximately 54° and 90° turns to feed the remaining turbine nozzle sectors 102 between strut passages 58. Of course, the turning angles given herein are given by way of example for a five-strut system and may vary for slightly different multistrut configurations while staying within the spirit of the present invention. The compact sizing of the main frame 80 in the vicinity of the turning plenum facilitates the incorporation of an instrumentation and lubrication service passage 104 through the strut leading edge to the sump 105 associated with bearing 92. The problem of hoop stress flow line continuity for 360° around the drive manifold in the vicinity of inlet 54 is solved by designing the inlet as a split port having a center web 106 (see FIG. 2). Essentially, the hoop loads jump the inlet 54 through three paths formed by center web 106 and side rails 108.

Turbine bleed frame 34 is disposed immediately downstream of main frame 80 and is attached thereto by means of bolted connections 110. Bleed frame 34 comprises one example of means for directing a portion of the turbine motive air to mixer 36 and for directing the remainder from the simulator as a nonpropulsive stream. Referring now to FIGS. 1, 5, 6, 8, 9 and 18, it may be appreciated that the bleed frame 34 is of complex geometry, being generally annular in shape and having numerous flow passageways integrally cast and/or chemically machined therein. Directing attention first to FIG. 5 and FIG. 18 (which is a cross-sectional view taken along a staggered plane through the bleed frame for purposes of illustration as shown in FIGS. 1 and 5) and, in particular, directing attention initially to the top half of FIG. 18 which is a view looking aft along the juncture 74 of main frame 80 and bleed frame 34, it will be appreciated that the frame comprises an outer structural ring 112 which mates with main frame 80 and a coaxial inner generally frustoconical structural member 114 which partially defines a generally annular chamber 115 for the passage of turbine motive air downstream of turbine 48. Extending radially inwardly from outer structural ring 112 are a plurality of struts 116 equal in number to main frame struts 88 and forming an axial tandem extension thereof as shown in FIG. 6. The radially inner end of each strut transists at its forward edge (plane 74) into an inner structural ring 118 which mates with main frame inner annular support member 86. The outer surface 120 of ring 118 and the inner surface 122 of outer structural ring 112 comprise walls defining a continuation of compressor discharge flow passageways 64 which are carried through the mixer 36 and into the exhaust nozzle as shown in FIG. 5. In other words, surfaces 120, 122 and strut walls 83, 116 define passageways 64 which transit into a plurality of compressor discharge air chutes of steadily increasing annulus height between bleed frame struts 116.

High pressure motive air discharged from turbine 48 enters generally annular flow path 115 formed between frustoconical member 114 and entering 118 whereupon it is divided by annular flow splitter 124 into two portions, one of which enters annulus 126 below splitter 124 and the other portion of which enters upchutes 66, one of which is formed internally of each strut 116. Upchutes 66 have a rapidly varying cross section, each transisting from a circumferentially long oval in the "turbine's eye" view of the upper portion of FIG. 18 (and inset, FIG. 8), through a generally triangular shape as shown in FIG. 8 to axially elongated oval 66 as shown in FIG. 6. To provide additional upchute area, auxiliary aerodynamically contoured struts 128, the locus of the leading edge of which is denoted by the dotted line 130 of FIG. 5, are provided, two each (for this particular design) between each circumferentially adjacent pair of struts 116. These auxiliary struts extend rearward through mixer 36 in the same manner as struts 116. In order to ensure low loss bleed extraction through upchutes 66, the entrance to upchutes 66 is contoured into a plurality of upstream extending wedges 132 (FIG. 9). These wedges efficiently capture the turbine discharge motive fluid which, due to large variations in loading of the single-stage turbine 48, experience large swings in turbine exit swirl angle (as much as ±50°).

Beyond the upchute inlets, each upchute feeds two outer oval injector slots 134, 136 formed within struts 116 and 128 and terminating at plane 76 as is best shown in FIGS. 5 and 10, and/or dumps into an annular plenum 138 within bleed manifold 68. Flow annulus 126 feeds turbine discharge air into two inner oval injector slots 140, 142 formed in each strut.

A slightly modified bleed frame 34' is depicted in FIGS. 19 and 20 in which the two inner oval injector slots 140', 142' are fed directly from upchutes 66, thereby deleting annulus 126. While at first glance it may appear that this modified bleed frame is more simplified than that previously described, careful analysis will reveal that bleed frame 34' is much more difficult to manufacture since slots 140', 142' are of constantly varying cross section and, therefore, cannot be easily formed by such processes as electrodischarge machining (EDM). Thus, these slots would require complex casting cores or multiple EDM steps for their formation. The alternative embodiment of FIGS. 19 and 20 does indicate, however, that the propulsion simulator of FIG. 1 can be modified and yet still remain within the spirit and scope of the present invention.

Bleed manifold 68, as depicted in FIG. 18, has several features in common with drive manifold 56 depicted in FIG. 4 and described above. As with the drive manifold, bleed manifold 68 is mounted eccentrically with respect to bleed frame 34 to produce a scrolled plenum 138 for the receipt of turbine motive air from upchutes 66 and which diverges in flow area from a minimum area at the location opposite port 70 to a lager area at the center of port 70 in order to optimize the turbine discharge motive air Mach number in the same manner as annular plenum 94 optimized the turbine inlet motive air Mach numbers. Turbine motive air discharges through dual ported exit 70 as a nonpropulsive stream. Again, as with drive manifold 56, hoop stress flow line continuity is assured through the provision of three load paths (i.e., center web 141 and side rails 143, FIG. 3).

One of the two significant fuel-fired engine cycle parameters which must be accurately simulated by the compact propulsion simulator in a wind tunnel model installation is engine pressure ratio (EPR). It has proven impractical to set the demand EPR when the total pressure profile (in the circumferential and radial directions) across the exhaust nozzle throat plane 144 is not only grossly distorted but also widely variable over the full operational map to be simulated. For this reason, the turbine discharge air passing through injector slots 134, 136, 140 and 142 must be well mixed with the compressor discharge air passing through chutes 64. Further, this must be accomplished within the short axial mixing length available between the mixer exit discharge plane 146 and the exhaust nozzle throat 144. This mixing problem is several fold more complex than that encountered with the full-sized, fuel-fired engine to be simulated since the air in upchutes 66 can have a pressure associated therewith of up to about 650 psia whereas the compressor discharge air in chutes 64 with which it must be mixed is at a significantly lower pressure, typically 50 psia. In full-size, fuel-fired gas turbine engines, this degree of pressure mismatch is unheard of.

The solution is the incorporation of chuted, multichoke mixer 36 as shown in FIGS. 5-7 and 10-17. The mixer resembles a spoked wheel comprising two coaxial structural rings 148, 150 having a plurality of connecting hollow radial struts 152 extending therebetween, the number of struts equaling the combined total of bleed frame struts 116 and 128. In fact, struts 152 are in alignment with and tandemly connected to struts 116 and 128 to complete the aerodynamically contoured strut assemblies 90 (FIG. 6). This mixer 36 is inserted into the aft end of the bleed frame 34 as shown in FIG. 5, with upchute air delivered from bleed frame injector slots 134, 136, 140, 142 entering mixer struts 142 through a plurality of aligned choke slots 154, sized for sonic flow, in the upstream end 155 of struts 152. These mating slotss are sealed at the junction of bleed frame 34 and mixer 36 (plane 76) by a plurality of resilient oval seals 156 (FIG. 10). Turbine discharge motive fluid passes sequentially through the first set of choke slots 154 into a first choke plenum 158, thereby producing a first increment of pressure drop, through a second set of choke slots 160 in baffles 162 and into a second choke plenum 164, thereby producing a second increment of pressure drop, and thereafter discharges through a third set of choke slots 166 in trailing edge 168, thereby producing a third increment of pressure drop. Choke plenums 158 and 164 are, of necessity, very compact and to avoid direct through flow which would tend to limit their effectiveness as plenums, the three sets of choke slots are polarized and misaligned with respect to each other. In particular, note that the oval slots 134, 136 of FIG. 10 are oriented with their major axes in the radial direction, oval slots 160 of FIG. 11 are oriented with their major axes in the circumferential direction, and oval slots 166 of FIG. 12 are oriented with their major axes alternating in the radial and circumferential directions. This comprises an excellent means for reducing the pressure of the turbine discharge motive air as it passes through the mixer.

The basic mixer includes an integrally cast structure comprising coaxial structural rings 148, 150 and a forward hollow strut portion 170 (FIGS. 6 and 15) containing first choke plenum 158 only. After the choke slots 160 are produced in baffles 162 which comprises the aft face of the integral structure, a plurality of individual, segmented trailing edge inserts 172 are piloted between rings 148 and 150 and brazed in place (FIG. 5). Inserts 172 cooperate with spoked baffles 162 to define second choke plenums 164 therebetween.

Three types of inserts are provided to simulate a range of required mixer performance. The standard wedge insert of FIG. 12 produces a moderate mixing shear perimeter between the injected turbine motive fluid and the compressor discharge air exiting chutes 64. About twice the mixing effectiveness can be provided by means of the finned inserts 174 of FIGS. 13 and 14 which inject turbine motive air through a pattern of radial slots 176 and circumferential slots 178. Alternatively, the vectored trailing edge insert 180 of FIG. 16 imparts swirl to the turbine motive airstream to provide a greater helical mixing length and effectiveness within the given confines of axial length. However, the vectored trailing edge inserts must be used in conjunction with a stage of deswirl vanes (not shown) between the discharge of mixer 36 and nozzle throat 144 in order to re-orient the flow toward the axial direction. Thus, the interchangeability of inserts provides a means for modulating the degree of mixing effectiveness between the compressor and turbine discharge airstreams. Generally speaking, a mixer intended for the simulation of a dry operating mode will have sots 154, 160 and 166 which are smaller than the corresponding slots associated with the same simulated engine operating in the reheat mode. This is due to the fact that in the dry mode not as much turbine motive air is required to be mixed with the compressor discharge air. In fact, for dry engine simulation, nozzle 38 would typically be replaced with a nozzle having an internal flow path contour substantially as represented by dashed line 220 of FIG. 1.

In order to facilitate the simulation of a wide range of engine propulsive cycles, a mixer insert as shown in the cross section of FIG. 17 may be provided. A pair of generally tubular valves 181, 183 have been fitted within choke plenums 158 and 164, respectively. Each valve has an inlet 185 in general alignment with an incoming set of choke slots (either 154 or 160) and an outlet 187 discharging into the associated choke plenum. The valves 181 and 183 are pivoted about or translated along their longitudinal axis so as to modulate the turbine discharge flow rate through the mixer. The radial extremities may be provided with means for turing or translating valves 181 and 183 from outside of the propulsive simulator without the necessity of teardown. Such means are within the capability of those skilled in this particular art and need not be described in further detail herein. Clearly, when operating in the dry mode, valves 181 and 183 may be rotated or moved to reduce the amount of turbine discharge motive air mixing with the compressor discharge air.

The configuration of main frame 80, bleed frame 34 and mixer 36 provides a unique solution to a very stringent and challenging installation envelope requirement. It will be recognized that at any cross-sectional plane through the simulator component, provision must be made for the concurrent flow of both compressor discharge airflow (i.e., through passages 64) and high pressure turbine motive air (i.e., through passageways 58 and upchutes 66). However, the third parameter which must be considered is the passage wall thickness separating the two flows since these walls occupy cross-sectional area and can only be reduced to a minimum thickness before they are overstressed or reach the limits of contemporary casing technology. Thus, there must be an acceptable trade off between the flow passage areas and structural wall thickness. The configuration of this invention provides for a relatively rapid curvature of the compressor discharge air passageway inner wall 182 (FIG. 1) toward the simulator centerline 96 through bleed manifold 34. This, in turn, provides more space (on a cross-sectional basis) for upchutes 66 and thin pressure vessel walls 183 between passageways 64 and upchutes 66 (as shown in FIGS. 6 and 18, for example) without excessive blockage of passageway 64 area. In other words, since the inner boundary diameter of passageways 64 as represented by walls 182 is decreased, the total annulus area for passageways 64, upchutes 66 and the pressure vessel wall is increased, and sufficient area can be allocated to each of these parameters in a compact design.

Referring to FIG. 1, it may be seen that the simulator is provided with a contoured tie bolt 186 which is threaded into bleed frame 34 as shown and which functions as a centerbody for the expansion of flow exiting the mixer. Tie bolt 186 provides the inner piloting diameter for mixer 36 which it captures by means of flanged cap 189. The exhaust system may be changed from one configuration to another by unbolting the exhaust nozzle 38 from bleed frame 34 at flange connection 184, unscrewing center tie bolt 186 which captures the mixer, and sliding the mixer aft until it clears the piloting diameter 188 in bleed frame 34. With the exhaust nozzle removed or loosened, the bleed manifold 68 can be changed by sliding it aft to clear bleed frame 34 or it can be rotated circumferentially to align discharge ports 70 to any desired circumferential orientation to compensate for differences of installation in scale wind tunnel aircraft models. Similarly, with split retainer ring 93 removed, drive manifold 56 can be changed or clocked.

Center tie bolt 186 is configured to perform a dual function. Besides retaining mixer 36 within the piloting diameter 188 of bleed frame 34, it is utilized to maintain the proper thrust loading on aft bearing 92 or forward bearing 190. The tie bolt is provided with at least one orifice 192 which communicates throug a bore 194 and opening 196 in bleed frame 34 with cavity 198 aft of turbine rotor 48. It is well known that the pressure differential across the turbine rotor is an important parameter in determining the rotor thrust bearing loads and that the bearings must be properly loaded in order to ensure their survival in such high-speed turbomachinery as the present invention. With each build-up variation of the propulsion simulator, rotor thrust bearing loads will change and orifice 192 provides a means for modulating the pressure differential across the turbine rotor to re-establish the desired bearing loads. Typically, turbine discharge air leaks through a labyrinth seal 200 (FIG. 5) between rotatable turbine 48 and stationary bleed frame member 114 and flows into cavity 198. It is then ejected through orifice 192 to supplement the flow through mixer slots 166 and the propulsive stream near the engine centerline. These tie bolts are provided in a family of orifice sizes for selectively modulating the pressure in cavity 198. The larger orifice sizes lower the static pressure in cavity 198 and, therefore, increase the aft rotor thrust.

Figure 22:
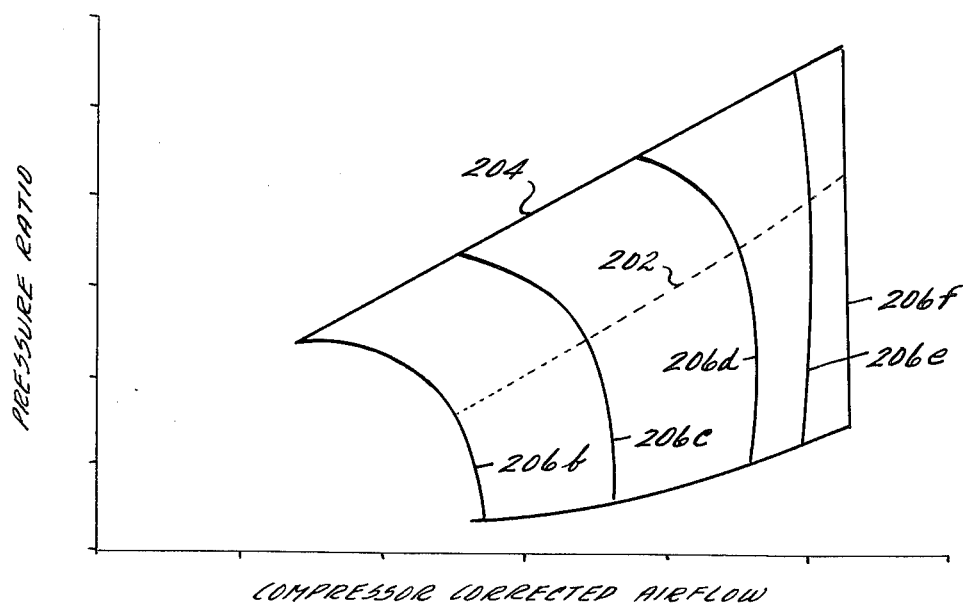

Attention is now directed to FIGS. 21 and 22 which depict what are commonly referred to as the performance or operational maps of the compact multimission aircraft performance simulator of FIG. 1 in the dry and augmented operating modes, respectively. Referring first to FIG. 21, engine pressure ratio (total pressure of propulsive flow exiting nozzle 38 divided by inlet 42 total pressure) is plotted as a function of corrected airflow through compressor 34. The locus of points representing a typical operating range of the simulator is indicated by operating line 202, whereas the locus of points at which the compressor experiences aerodynamic stall is indicated as the stall line 204. Lines of constant corrected compressor rotational speed are indicated at 206a through f with speed increasing to the right in FIG. 21. Generally speaking, the relationship of lines 202 and 204 to each other is determinative of compressor stall margin as is known to those skilled in the art. The minimum operating line, established by choked flow condition in upchutes 66 (or at any downstream point in the bleed system), is indicated by line 208. Therefore, gas turbine engines are designed to operate, typically, at some point, such as 210, where there is adequate stall margin. However, the present invention provides a means for altering the performance map of FIG. 21 by means of simple changes to the geometry of simulator components to permit a wider range of simulator operation to permit the simulation of a wide variety of engines and cycles, without incurring stall or choke flow.

For example, by increasing the size of passageways 64, the stall line 204 will migrate in the direction of arrows 212 whereas larger upchutes 66 will cause the choke line 208 to migrate in the direction of arrow 214, thereby increasing the potential operational flexibility of the simulator. Conversely, reducing the size of passageways 64 and upchutes 66 will cause the stall and choke lines to migrate in the directions of arrows 216 and 218, respectively, thereby narrowing the effective operating range. FIG. 22 merely represents, for comparison purposes, the corresponding performance map for simulation of the augmented mode, with similarly labeled elements representing analogous operating characteristics.

It should be obvious to one skilled in the art that certain changes can be made to the above-described invention without departing from the broad, inventive concepts thereof. For example, the geometry of upchutes 66 and injector slots 134, 136, 140 and 142 could be modified as discussed hereinabove providing that a way exists for a portion of the turbine discharge air to feed mixer 36 and plenum 138 contemporaneously. Also, mixer 36 may be retained in proximity to the bleed frame by means other than those described. It is intended that the appended claims cover these and all other variations in the present invention's broader inventive concepts.

Having thus described the invention, what is claimed as novel and desired to be secured by Letters Patent of the United States is:

1. In a method of simulating the in-flight aerodynamic characteristics of a gas turbine engine with an apparatus of reduced size in relation to the engine to be simulated and of the type having a compressor for pressurizing a flow of air and a turbine for driving the compressor, the steps of:
   rotationally driving the turbine with externally generated, high pressure motive air;
   pressurizing with the compressor a flow of air to a pressure level substantially less than the turbine motive air;
   mixing a portion of the turbine discharge motive air with the compressor discharge air to generate a flow mixture having a generally uniform pressure profile with a pressure ratio across said apparatus substantially identical to the engine to be simulated;
   passing the flow mixture through a propulsive nozzle at a nozzle flow function substantially identical to the engine to be simulated; and
   passing the remainder of the turbine motive air from the apparatus as a separate, non-propulsive stream.

2. In the method of simulating the in-flight aerodynamic characteristics of a gas turbine engine as recited in claim 1, the additional step of modulating the amount of turbine discharge motive air which is mixed with the compressor discharge air to simulate either reheat or dry engine cycles.

3. In the method of simulating the in-flight aerodynamic characteristics of a gas turbine as recited in claim 1, the additional steps of sizing the inlet to the compressor and the exhaust nozzle in predetermined reduced size linear scale in relation to the engine to be simulated and passing a flow through the inlet substantially equal to the corresponding flow of the engine to be simulated times the square of the linear scale factor.

4. In a method of simulating the in-flight aerodynamic characteristics of a gas turbine engine with an apparatus of a reduced size in relation to the engine to be simulated and of the type having a turbine driven by externally generated, high pressure motive air, an inlet, a compressor downstream of the inlet and driven by the turbine for pressurizing a separate flow of air to a pressure level substantially less than that of the turbine motive air, and a propulsive nozzle, wherein the inlet and exhaust nozzle are sized in predetermined reduced size linear scale in relation to the engine to be simulated, the steps of:
   pressurizing through the compressor a flow of air substantially equal to the engine to be simulated times the square of the linear scale factor;
   mixing a portion of the turbine motive discharge air with the compressor discharge air to generate a flow mixture having a generally uniform pressure profile with a pressure ratio across said apparatus substantially identical to the engine to be simulated; and
   passing the flow mixture through a propulsive nozzle at a nozzle flow function substantially identical to the engine to be simulated; and
   passing the remainder of the turbine motive air from the apparatus as a separate, non-propulsive stream.

5. In the method of simulating the in-flight aerodynamic characteristics of a gas turbine engine as recited in claim 4, the additional step of modulating the nozzle flow function to simulate a variety of engine propulsive cycles.

6. The method of simulating the in-flight aerodynamic characteristics of a gas turbine engine as recited in claim 5 wherein the nozzle flow function is modulated by varying the amount of turbine discharge motive air which is mixed with the compressor discharge air and passed through the propulsive nozzle.

7. The method of simulating the in-flight aerodynamic characteristics of a gas turbine engine as recited in claim 6 wherein the nozzle flow function is further modulated by changing the geometry of the exhaust nozzle.

8. A compact multipurpose aircraft propulsion simulator for simulating the in-flight aerodynamic characteristics of a gas turbine engine comprising:
   a flow inlet sized to a reduced size linear scale in relation to the engine to be simulated;
   a compressor sized to pressurize a flow of air from said inlet substantially identical to that of the engine to be simulated times the square of the linear scale factor;
   a turbine drivingly connected to said compressor;
   means for routing an externally generated flow of high pressure motive air to said turbine to rotationally drive said turbine and compressor;
   means for mixing a portion of the turbine motive air with the air pressurized by the compressor to generate a mixture having a generally uniform pressure profile with a pressure ratio across the simulator substantially identical to the engine to be simulated; and
   a nozzle downstream of said mixing means, sized substantially identical to the engine to be simulated times the linear scale factor and having associated therewith a nozzle flow function substantially identical to the engine to be simulated, for discharging said mixture as a propulsive jet.

9. The simulator as recited in claim 8 further comprising a means, disposed between said turbine and said mixing means, for directing a portion of the turbine motive air from said turbine to said mixing means and for directing the remainder of the turbine motive air from said turbine and out of said simulator as a non-propulsive stream.

10. The simulator as recited in claim 9 wherein said means for directing a portion of the turbine motive air from said turbine to said mixing means and for directing the remainder of the turbine motive air from said turbine and out of said simulator as a non-propulsive stream comprises a bleed frame having a generally annular chamber for receipt of motive air discharged from said turbine, a plurality of upchutes formed within said bleed frame and in fluid communication with said chamber, a plurality of injector slots formed within said bleed frame in fluid communication with said chamber, and a flow splitter for dividing the motive air within said chamber into two portions, one of which enters said upchutes and the other of which enters said slots.

11. The simulator as recited in claim 10 wherein said mixing means comprises an annular, chuted mechanical mixer having a plurality of hollow mixer struts, the interiors of which are in fluid communication with said injector slots and the exteriors of which are aerodynamically contoured to partially define a plurality of passageways for directing air pressurized by said compressor to said nozzle.

12. The simulator as recited in claim 11 wherein said mixer struts include a trailing edge having a plurality of choke slots for discharging turbine motive air.

13. The simulator as recited in claim 12 wherein air pressurized by the compressor and turbine motive air are discharged into said nozzle as alternating streams.

14. The simulator as recited in claim 11 wherein said mixer includes means for reducing the pressure of the turbine motive air as it passes through the mixer.

15. The simulator as recited in claim 14 wherein said pressure reducing means comprises a pair of perforated baffles separated by a choke plenum.

16. The simulator as recited in claim 15 wherein said baffles are perforated with generally oval slots and wherein the slots of the downstream baffle are misaligned with respect to the slots of the upstream baffle.

17. The simulator as recited in claim 14 wherein the downstream baffle comprises the trailing edge of said mixer struts.

18. The simulator as recited in claim 9 wherein said means for directing a portion of the turbine motive air from said turbine to said mixing means and for directing the remainder of the turbine motive air from said turbine and out of said simulator as a non-propulsive stream comprises a bleed frame for receipt of motive air discharged from said turbine, a plurality of upchutes formed within said bleed frame for directing turbine motive air from said bleed frame as a non-propulsive stream and a first plurality of injector slots formed within said bleed frame in fluid communication with said upchutes for directing motive air to said mixing means.

19. The simulator as recited in claim 18 wherein said bleed frame is provided with a generally annular chamber for receipt of turbine discharge motive air, a second plurality of injector slots in fluid communication with said chamber and a flow splitter for dividing the motive air into two portions, one of which enters said upchutes and the other of which enters said second plurality of slots.

20. The simulator as recited in claim 18 wherein said bleed frame comprises a generally annular chamber for receipt of turbine discharge motive air, an outer structural ring and an inner generally frustoconical support member partially defining said chamber connected by a plurality of hollow primary bleed frame struts, and wherein said upchutes and said injector slots are formed with said primary bleed frame struts.

21. The simulator as recited in claim 20 wherein said primary bleed frame struts are aerodynamically contoured to partially define a plurality of passageways for directing air pressurized by the compressor to said nozzle.

22. The simulator as recited in claim 21 wherein said primary struts increase in length in the downstream flow direction and wherein said passageways for directing air pressurized by the compressor are each defined by the outer structural ring and a generally coannular inner flow passage wall which diverges radially inwardly from said outer structural ring in the downstream flow direction.

23. The simulator as recited in claim 20 wherein said bleed frame further comprises a plurality of aerodynamically contoured auxiliary bleed frame struts interposed circumferentially between said primary bleed frame struts, each auxiliary bleed frame strut having a leading edge located downstream of said turbine, and wherein said upchutes and said injection slots are formed within said primary and auxiliary bleed frame struts.

24. The simulator as recited in claim 20 wherein said mixing means comprises an annular chuted mixer piloted within the outer structural ring of said bleed frame, said mixer having a plurality of hollow mixer struts aligned with and comprising an extension of said primary bleed frame struts, the interiors of said mixer struts being in fluid communication with said injector slots.

25. The simulator as recited in claim 18 wherein said first plurality of injector slots are of generally oval shape where the air discharges from said bleed frame.

26. The simulator as recited in claim 18 wherein said bleed frame further comprises a contoured wedge between the entrances to each adjacent pair of upchutes.

27. The simulator as recited in claim 18 further comprising a generally circular bleed manifold mounted eccentrically about said bleed frame to define a discharge scrolled plenum therebetween in fluid communication with said upchutes for receipt of turbine motive air and having an exit for the discharge of such air as a non-propulsive stream.

28. The simulator as recited in claim 27 wherein said bleed manifold comprises a dual ported flow exit having multiple hoop stress load paths.

29. The simulator as recited in claim 8 wherein said routing means comprises a generally circular drive manifold having an inlet for receiving the high pressure turbine motive air and a main frame mounted eccentrically within said drive manifold to define therebetween an inlet scrolled plenum of varying area for the distributing or turbine motive air, wherein said main frame is further characterized as including a plurality of hollow struts in fluid communication with said annular plenum for routing turbine motive air radially inwardly from said plenum to the turbine.

30. The simulator as recited in claim 29 wherein said main frame comprises an outer structural ring partially defining said inlet scrolled plenum and an inner annular support member generally concentric with said outer structural ring, and wherein said hollow struts connect said outer structural ring and said inner annular support member to partially define a plurality of generally axial flow passageways for ducting compressor-pressurized air through said routing means.

31. The simulator as recited in claim 30 wherein said routing means further comprises a generally annular hub mounted generally concentrically within said inner annular support member and defining therebetween a turning plenum in flow communication with said hollow strut interiors for turning the turbine motive air toward the generally axial direction.

32. The simulator as recited in claim 31 wherein said routing means further comprises a plurality of flow dividers extending radially from said hub into said turning plenum in general alignment with the interior of said hollow struts.

33. The simulator as recited in claim 31 wherein said turbine is connected to said compressor by a shaft journaled for rotation within said hub.

34. The simulator as recited in claim 33 further comprising a bearing and a lubrication sump between said hub and shaft.

35. The simulator as recited in claim 34 wherein one strut includes a service passage extending through said strut between said inlet scrolled plenum and said sump.

36. The simulator as recited in claim 29 wherein said struts are aerodynamically contoured.

37. The simulator as recited in claim 29 wherein said struts are swept axially about 15 degrees from the radial direction.

38. The simulator as recited in claim 29 wherein the greatest flow area associated with said inlet scrolled plenum is proximate said drive manifold inlet.

39. The simulator as recited in claim 29 wherein said compressor includes a generally cylindrical casing, having a projecting collar, said drive manifold is piloted by the outside diameter of said strutted main frame and is limited in rearward axial travel by a stepped diameter portion of said main frame and further comprising a retaining ring disposed between said collar and drive manifold to restrain said drive manifold against forward movement.

40. The simulator as recited in claim 8 wherein said routing means comprises a main frame including a plurality of aerodynamically contoured hollow struts, the interiors of which fluidly communicate between the source of high pressure motive air and said turbine, and the exteriors of which partially define a plurality of passageways for ducting air pressurized by the compressor to said nozzle.

41. The simulator as recited in claim 8 further comprising a drive air valve for modulating the flow of turbine motive air into said routing means.

42. The simulator as recited in claim 8 further comprising a bleed air valve for modulating the amount of turbine motive air which is mixed with the air pressurized by the compressor to simulate either dry or reheat engine cycles.

43. The simulator as recited in claim 42 further comprising a drive air valve for modulating the flow of turbine motive air into said routing means.

44. The simulator as recited in claim 8 wherein said mixing means comprises an annular chuted mechanical mixer in which circumferentially adjacent chutes discharge, alternatively, air pressurized by said compressor and turbine motive air.

45. In a compact multipurpose aircraft propulsion simulator for simulating the in-flight aerodynamic characteristics of a gas turbine engine of the type having a compressor for pressurizing a first flow of air and a turbine driven by an externally generated, second flow of high pressure motive air, the improvement comprising a chuted mechanical mixer having a plurality of aerodynamically contoured struts, adjacent pairs of struts partially define a plurality of flow chutes for the first flow of air through said mixer, said struts including a pair of internal perforated baffles separated by a plenum through which turbine motive air is sequentially routed to reduce the pressure thereof and wherein the second baffle through which the turbine motive air passes comprises the strut trailing edge.

* * * * *